March 19, 1968     C. J. MANNEY ET AL     3,373,560
JOINER LINK
Filed April 18, 1966
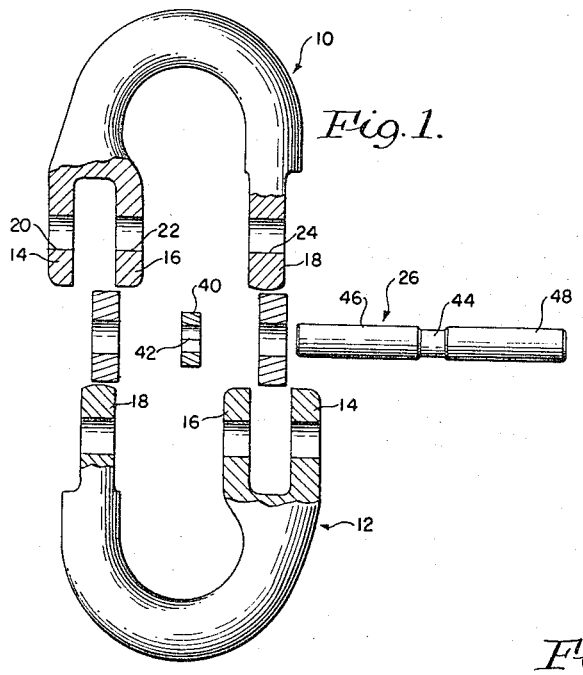
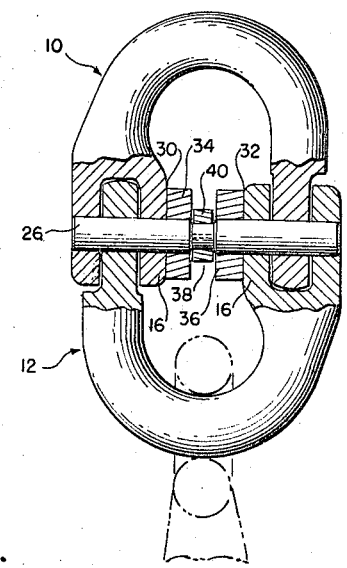
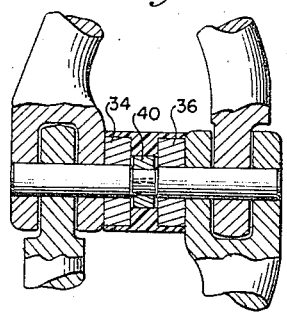
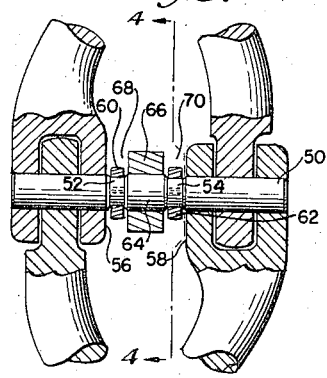
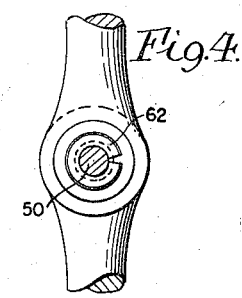
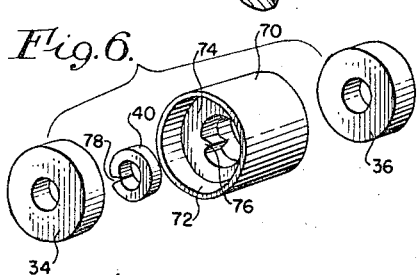
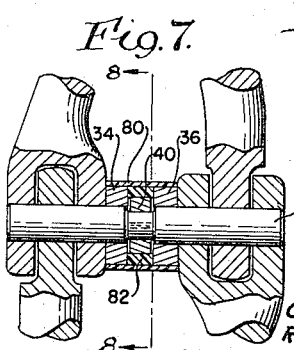
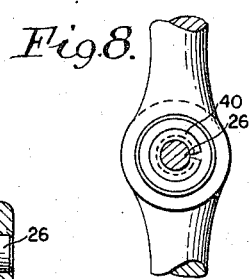
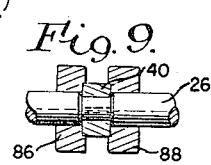
INVENTORS
CHARLES J. MANNEY
RAYMOND M. ROBINSON
DENNIS MOLNAR
BY Bean, Brooks, Buckley & Bean
ATTORNEYS

United States Patent Office 3,373,560
Patented Mar. 19, 1968

3,373,560
JOINER LINK
Charles J. Manney, Kenmore, Raymond M. Robinson, Clarence, and Dennis Molnar, Kenmore, N.Y., assignors to Columbus McKinnon Corporation, Tonawanda, N.Y.
Continuation-in-part of application Ser. No. 326,966, Nov. 29, 1963. This application Apr. 18, 1966, Ser. No. 543,282
7 Claims. (Cl. 59—85)

This invention relates to devices for joining together links of chain, for joining a length of chain to a hook or the like and pertains more particularly to improved means for preventing accidental disengagement of the parts so joined.

This application is a continuation-in-part of our copending application Ser. No. 326,966, filed Nov. 29, 1963, now abandoned.

Joiner links comprising two link halves articulately or pivotally joined by means of a pin and in association with some mechanism for locking the pin in place after assembly are old and well known, being useful for many applications. However, a problem which has plagued this art for many years is the question of providing some means for locking the pin in place and preventing its accidental disengagement but which does not require special tools to be used in the assembling of the joiner link which, at the same time, is of such nature as to be relatively immune to accidental damage which might permit the pin to be dislodged and the joiner link halves to separate unintentionally. The problem is further complicated by virtue of the fact that the lock means must also be of such nature that it does not inordinately increase the cost of the joiner link assembly.

To our knowledge, no prior art device meets all of the above requirements and, more particularly, to our knowledge, those joiner link assemblies which successfully meet the tests of allowing easy assembly without the requirement for special tools and which feature a lock for the pin which is not easily damaged or destroyed do not concomitantly achieve these ends in a fashion which is economical and such joiner links, therefore, are inordinately expensive even though they may otherwise be acceptable.

Essentially, the present invention is concerned with a joiner link assembly wherein two pivotally interconnected link halves are joined by a pin passing through intercalated portions of the link halves and which pin is provided with a spring clip or liked evice which serves to prevent axial displacement of the pin with such spring clip device being located between the interdigitated ends of the link halves and is thereby, as is the usual practice, in a position which might be vulnerable particularly when the joiner link is dragged across the ground or impinged against a solid object, the essence of the invention residing in the provision of a protective washer or washers also located between interdigitated ends of the link halves and collectively with the spring clip device substantially filling the gap or space therebetween but characterized by projecting radially of the pin well beyond the radial projection of the spring clip device and thus providing a very narrow throat leading to the spring clip device to thereby protect the same and minimize the possibility of damage and destruction of the spring clip device and consequent accidental axial withdrawal of the hinge pin.

Other objects and advantages of this invention will appear from the specification hereinafter and the accompanying drawing, wherein:

FIG. 1 is an exploded view showing one form of joiner link constructed in accordance with the present invention;

FIG. 2 is a view, partly in section, showing the assembled joiner link according to FIGURE 1;

FIG. 3 is a view similar to FIGURE 2 but showing a modified form of construction;

FIG. 4 is a sectional view taken substantially along the plane of section line 4—4 in FIGURE 3 and showing details of the pin assembly;

FIG. 5 is a view similar to FIGURES 2 and 3 but showing a further modification of the invention;

FIG. 6 is an exploded perspective view showing the essential components of the modification of FIGURE 5;

FIG. 7 is a view similar to FIGURES 2, 3 and 5 but showing a still further modified form of the invention;

FIG. 8 is a sectional view taken substantially along the plane of section line 8—8 in FIGURE 7; and FIG. 9 is a partial view, partly in section, showing a further modification of the invention.

With reference now more particularly to FIGURE 1, the joiner link assembly shown therein includes complementary link halves 10 and 12 each having at its opposite ends a pair of arms 14 and 16 and a single arm 18 respectively for interdigitation as shown in FIGURE 2. These several arms are provided with aligned openings 20, 22 and 24 which, when registered as shown in FIGURE 2, admit of the insertion therewithin of a pin assembly indicated generally by the reference character 26 which serves to pivotally join the two link halves together substantially as is shown. Joiner links constructed in this general fashion are old and well known. Associated with this general combination are various means to secure the pin 26 against inadvertent or accidental dislodgement which would permit separation of the two link halves and misjoinder of the components interconnected by the joiner link assembly. As has been stated, it is of primary concern in connection with this invention to provide an improved means for so locking the pin 26 against inadvertent displacement.

As can be seen in FIGURE 2, the spacing between the opposed faces 30 and 32 of the link halves' legs 16, 16 is normally such as to expose a sufficient portion of the pin assembly therebetween which would allow rocks, or other hard objects against which the joiner link may impinge to damage and possibly destroy any lock means provided within this area of the assembly.

In accordance with the form of the invention shown in FIGURES 1 and 2, this difficulty is overcome by the utilization of a pair of washers 34 and 36 which normally abut or lie closely adjacent to the opposed surfaces 30 and 32 as aforesaid and which narrow the gap therebetween to present a relatively slim throat 38 within which a locking clip member 40 is disposed in association with the pin and which, by reason of the narrowness of the throat 38 and the fact that the washers 34 and 36 extend radially a substantial distance beyond the locking clip 40 afford a degree of protection against accidental damage to the locking device 40 which, in a practical sense, substantially eliminates damage thereto such as would allow accidental displacement of the pin 26. The invention, then, concerns the combination in a joiner link assembly of protective means which narrows the normal throat space between adjacent legs of the link halves and which projects radially beyond the locking device to such an extent as to present a narrow throat leading to the locking device as to practically preclude the possibility of damage to the locking device.

The locking device may take simply the form of a C-shaped or substantially closed spring clip device, the split in the device 40 being shown at 42 in FIGURE 1 and this circlip or spring lock is engageable within the groove presented by the reduced diameter portion 44 disposed centrally of the pin 26 substantially as is shown. The clip 40 is normally closed as shown in FIGURE 1, and, as such, is of slightly smaller diameter than the diameters of the main portions 46 and 48 of the pin but which is of substantially the same internal diameter as the reduced portion 44. Under these circumstances, the parts, when aligned, and before the pin 26 is entered into position, will permit the pin 26 to be disposed in place by hammering the same by any suitable means which may conveniently be at hand in the field. Thus, the invention meets one primary test of joiner link assemblies, namely, that its assembly is sufficiently easy and requires no special tools as to permit assembly in the field.

A modified form of the invention is shown in FIGURE 3. In this figure, the pin 50 is provided with a pair of reduced diameter portions 52 and 54 which lie closely adjacent the opposed faces 56 and 58 of the joiner link legs and within which are received the spring clip devices 60 and 62. These devices may again be substantially closed or C-shaped elements as is shown perhaps best in FIGURE 4. In this case, the pin 50 is provided with a centrally disposed portion 64 which receives a washer 66 presenting, in the space between the two faces 56 and 58, two narrow throat portions 68 and 70 which are sufficiently narrow as to thoroughly protect the two spring clip devices 60 and 62 against accidental damage as aforesaid.

A further modification of the invention is shown in FIGURES 5 and 6. In this form of the invention, the pin is identical to that shown in FIGURES 1 and 2 as are the spring clip device 40 and the two washers 34 and 36. However, the protecting and locking assembly is integrated as a unit in this form of the invention so that greater ease of assembly is permitted and, furthermore, fewer component parts are required to be handled so that less likelihood of loss in the field before assembly is likely to occur. The protecting and locking device assembly is shown best in exploded fashion in FIGURE 6. The assembly includes a retainer sleeve 70 preferably formed of synthetic resinous material molded in suitable fashion to accommodate the spring clip 40 and the two washers 34 and 36. For this purpose, the sleeve 70 is provided with end recesses one of which is indicated by the reference character 72 in FIGURE 6 which receives the respective washers 34 and 36 and centrally of the sleeve is provided a web portion 74 which may be provided with a tang 76 adapted to receive the notch 78 presented by a simple piece of spring bar stock disposed in a circle substantially as is shown. When the several parts are assembled together as a unit, they present a unitary assembly which may be slipped between the interdigitated link halves and which allow the pin then to be driven through without requiring individual alignment of the parts since the unitary assembly presents the openings through the clip 40 and the washers 34 and 36 in alignment within the sleeves 70.

A further modification of the invention is illustrated in FIGURES 7 and 8. Here again an aligning sleeve 80 is provided for the spring clip 40 and the washers 34 and 36 so as to hold them in alignment and as a unitary assembly as aforesaid. In this case, however, instead of forming the sleeve as a single member, an inner sleeve 82 is provided centrally within the outer sleeve 80, substantially as is shown and within which is received the spring clip device 40. The principles remain the same in other respects as previously described.

A further modification is illustrated in FIGURE 9 and, like the forms of the invention shown in FIGURES 5 and 7, the FIGURE 9 construction is directed to ease of alignment of the spring clip member 40 and the associated washers 86 and 88. In this form of the invention, the two washers 86 and 88 are provided with recesses in opposed faces to receive and center the spring clip 40 therebetween so that all of the openings are properly aligned so that the pin 26 may be easily inserted thereinto.

In the forms of the invention shown in FIGURES 5 and 7, the sleeve devices, although functioning primarily for alignment purposes and to prevent accidental loss of the relatively small components used, also act as additional protective devices to cushion any blows which may be encountered but in actual practice, these sleeves usually wear away and finally fall off.

We claim:
1. A joiner link assembly comprising a pair of identical, substantial U-shaped, half coupling links each having one leg terminating in an eye portion having flat opposite sides and the other leg terminating in an end portion notched inwardly thereof to define a clevis device, the eye and clevis portions of said half links being interdigitated and provided with axially aligned bores,
  a hinge pin passing through all of said bores to pivotally join said half links, said pin having enlarged diameter end portions passing through the interdigitated ends of the half links and a central portion of reduced diameter disposed between said coupling links leg portions,
  an elastic-collar snap-fitted upon said reduced diameter pin portion and protruding therefrom beyond the diameter of the end portions of said pin, thereby detachably locking said pin and half coupling links in assembled relation,
  a pair of separate guard rings engaging said pin on opposite sides of said collar, the opposed faces of said guard rings constituting abutment surfaces against which said collar may bear to resist axial dislodgement of said pin from said links,
  a separate shield ring sandwiched between said guard rings and bridging at least partly between said abutment surfaces and circumferentially around said collar,
  and a resilient sleeve enclosing said guard rings and said shield ring and gripping the outer surfaces thereof to retain such rings in contiguous relation.
2. A joiner link assembly comprising, in combination,
  a pair of generally U-shaped link halves each of which terminates at one end in a single leg and at its other end in a spaced pair of legs with such legs of each pair being provided with aligned openings, the legs of the correspondingly opposite ends of said link halves being interdigitated with all of the openings therein in alignment,
  a pin extending through the openings in said interdigitated legs and hingedly interconnecting said link halves,
  spring clip means embracingly locked on said pin within that space between the interdigitated ends of the link halves, said spring clip means being of a diameter slightly greater than the maximum diameter of said pin and having a total width axially of the pin which is less than about half the axial width of said space,
  and collar means slidably received on said pin within the confines of said space, said collar means and said spring clip means being of a collective width substantially equal to the axial width of said space so as to minimize axial shifting of said pin, and said collar means being of a diameter substantially greater than the diameter of said spring clip means to present a throat leading to said spring clip means which is deeper than it is wide.
3. The assembly as defined in claim 2 wherein said spring clip means comprises a pair of spring clips located adjacent respective ones of the interdigitated ends of the link halves, and said collar means comprising a single washer disposed between said spring clips.

4. The assembly as defined in claim 2 wherein said spring clip means comprises a single spring clip centrally located within said space, and said collar means comprising a pair of washers straddling said spring clip.

5. The assembly as defined in claim 4 wherein the opposed faces of said washers are recessed to receive opposite sides of the spring clip therein.

6. The assembly as defined in claim 4 including a sleeve surrounding said spring clip and washers and retaining the same in alignment.

7. The assembly as defined in claim 6 wherein said sleeve comprises an outer tubular sleeve and a centrally located inner sleeve surrounding the spring clip.

References Cited

UNITED STATES PATENTS

| | | | |
|---|---|---|---|
| 1,513,729 | 11/1924 | Adams | 59—85 |
| 1,784,451 | 12/1930 | Kraemer | 59—80 |
| 2,255,217 | 9/1941 | Hill | 85—8.8 |
| 2,648,989 | 8/1953 | Cordis | 59—85 |
| 2,972,223 | 2/1961 | Devonshire | 59—88 |
| 3,104,519 | 9/1963 | Kelting | 59—86 |
| 3,134,221 | 5/1964 | Bergman | 59—85 |

CHARLES W. LANHAM, *Primary Examiner.*

C. P. CROSBY, *Assistant Examiner.*